Dec. 3, 1935.          H. S. JANDUS          2,022,667
                      BUMPER CONSTRUCTION
                    Filed June 26, 1933      2 Sheets-Sheet 1
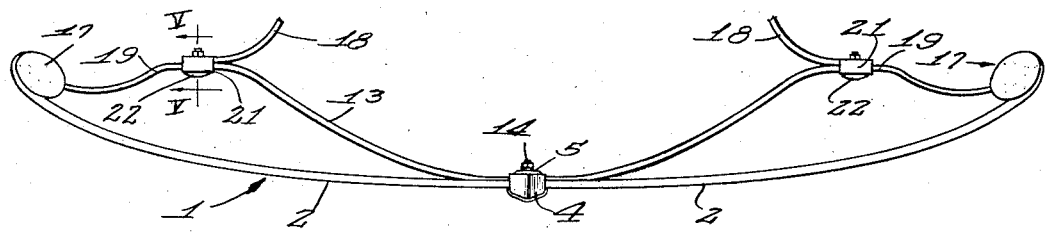
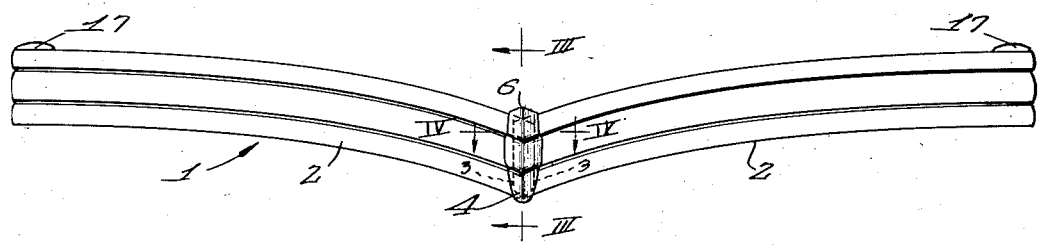
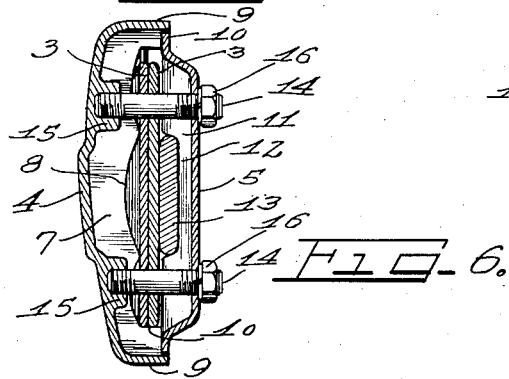
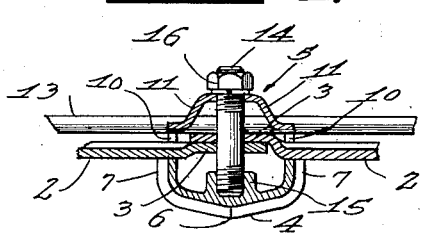
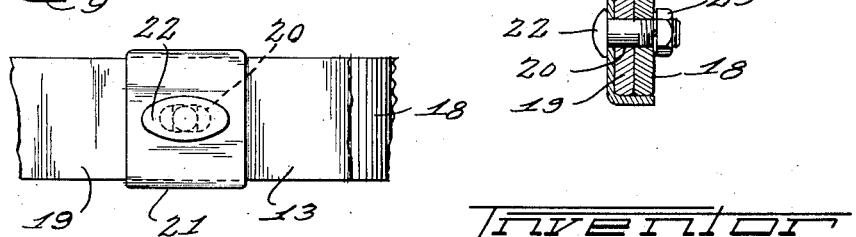
Inventor
HERBERT S. JANDUS.

Dec. 3, 1935.  H. S. JANDUS  2,022,667
BUMPER CONSTRUCTION
Filed June 26, 1933   2 Sheets-Sheet 2
Fig. 7.
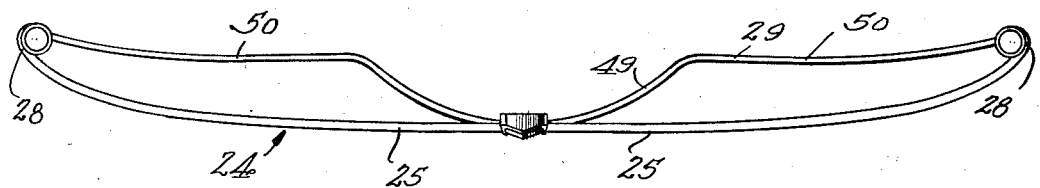
Fig. 8.
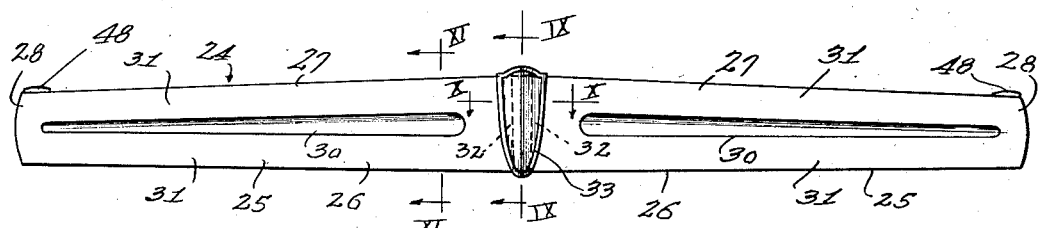
Fig. 9.   Fig. 11.   Fig. 10.
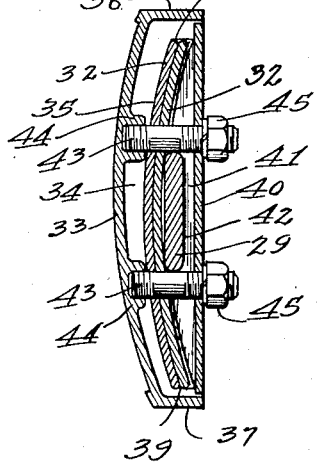 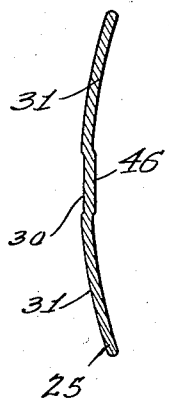 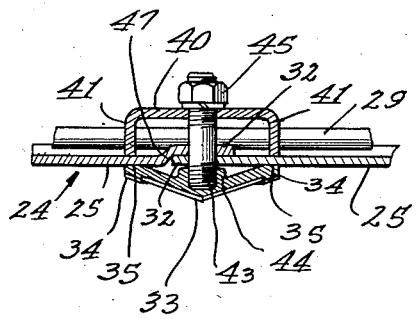
Inventor
HERBERT S. JANDUS.
by Charles W. Wills Atty s.

Patented Dec. 3, 1935

2,022,667

UNITED STATES PATENT OFFICE 2,022,667

BUMPER CONSTRUCTION

Herbert S. Jandus, Detroit, Mich., assignor to General Spring Bumper Corporation, Detroit, Mich., a corporation of Michigan Application June 26, 1933, Serial No. 677,583

11 Claims. (Cl. 293—55)

This invention has to do with bumpers, and is concerned more particularly with bumpers of the built-up type.

It is an object of this invention to provide a bumper structure embodying a plurality of impact sections and improved means for affording a rigid connection therebetween.

It is another object of the invention to provide an impact bar comprising sections which are lapped at the center of the bar, together with means for rigidly connecting the same so that the sectional impact bar will function as efficiently as a single integral impact bar.

It is another object of the invention to combine a medallion with means for connecting the ends of impact bar sections together.

It is a further object of the invention to secure the adjacent ends of impact bar sections in such a manner as to prevent relative movement of the parts associated with the connection.

It is a further object of the invention to provide a bumper structure embodying a single impact member consisting of a plurality of sections rigidly connected together, and including means whereby the supporting bar structure is also rigidly secured to the connected sections of the impact bar.

In carrying out the invention into practice, the impact bar is built up of a plurality of sections the adjacent ends of which are formed to lap each other, preferably though not necessarily at the center of the bar. The supporting structure is preferably formed so that a bar thereof is positioned behind the lapped portions, and these parts are thereupon connected by plates in front and at the rear, together with bolts passing through the lapped portions but preferably disposed respectively above and below the back bar portion. With the forward face of the impact bar curved as is usually the case nowadays, the medallion is preferably formed with engaging portions of a shape corresponding to said surface transversely, and that contributes greatly to the rigidity of the joint.

A built-up impact bar made in accordance with the present invention may embody two half sections as illustrated or may embody a greater number of sections, secured together with clamps as by bolts passing through the lapped portions and into the clamps as stated. The impact and back bars may be connected in any way, as by rivets or bolts or by hinges. A built-up bumper may be manufactured more cheaply than an integral impact bar since complex edge bending operations are obviated when it is desired to provide an impact bar of unusual shape such as would involve edge bending operations. The means employed in accordance with the present invention for connecting the lapped parts together, serves also as a means to connect intermediate portions of the impact and back bar, and serves further to provide the ornamental clamp means ordinarily employed in integral impact bar bumpers.

Further objects and advantages of the invention will appear as the description proceeds.

This invention (in preferred forms) is illustrated in the drawings and hereinafter more fully described.

On the drawings:

Figure 1 is a plan view of a bumper construction embodying the present invention.

Figure 2 is an elevational view of the construction shown in Figure 1.

Figure 3 is an enlarged sectional view taken substantially in the plane designated by the line III—III in Figure 2, certain parts being shown in elevation.

Figure 4 is a fragmentary sectional view taken substantially in the plane designated by the line IV—IV in Figure 2, certain parts being shown in elevation.

Figure 5 is an enlarged sectional view taken substantially in the plane designated by the line V—V in Figure 1, certain parts being shown in elevation.

Figure 6 is an enlarged fragmentary elevational view of the structure shown in Figure 5.

Figure 7 is a plan view of a modified form of the invention.

Figure 8 is an elevational view of the structure shown in Figure 7.

Figure 9 is an enlarged sectional view taken substantially in the plane designated by the line IX—IX in Figure 8, certain parts being shown in elevation.

Figure 10 is an enlarged fragmentary sectional view taken substantially in the plane designated by the line X—X in Figure 8, certain parts being shown in elevation.

Figure 11 is an enlarged sectional view taken substantially in the plane designated by the line XI—XI in Figure 8.

As shown on the drawings:

Referring now more particularly to the drawings, the impact bar constructed in accordance with the present invention is designated generally at 1 and comprises two sections 2 of any desired cross section, that illustrated being in the form of a cycloid of three revolutions or, otherwise stated, simulating three bars of concavo-convex cross section placed edge to edge with their convex surfaces on the same side. The sections 2 are symmetrically arranged to form an impact bar which has the appearance in elevation of a shallow V. The sections 2 are connected by a lap joint, and to that end, the overlapped portions 3 are flattened so that they may lie flush one against the other as shown in Figures 3 and 4.

It will be observed that the sections 2 meet at an angle at a point below the level of the remainder of said sections, producing an effect which is in harmony with present day radiator and radiator grill designs, which are generally V-shaped horizontally and vertically at the center. Such a design for impact bars is practically impossible of attainment with a single integral impact bar, because of difficulty of making a sharp edge bend and the prohibitive cost which such construction would entail.

It is essential that the connection between the lapped portions 3 of the sections 2 be rigid in order that the bar 1 may function as efficiently as a single integral bar. To this end, a clamp and securing structure embodying front and back plates 4 and 5, respectively, and bolt means are employed in cooperative relation.

The clamp plate 4 is formed as a medallion for ornamental purposes and, for the purpose of harmonizing with the bumper bar 1, is of generally angular shape in cross section so that the corner thereof is disposed substantially directly in front of the center of the composite bar 1 as shown at 6. The plate 4 is hollow, and the rearwardly extending side flanges 7 thereof are formed with clamping edges 8 of a configuration conforming to the impact surfaces of the sections 2 for clamping engagement therewith as shown in Figure 3. The upper and lower flanges 9 extend respectively above and below the lapped portions 3 of the impact sections 2 and are formed with horizontal edges 10 for engagement with the edge portions of the sections 3 adjacent their juncture.

The rear clamp plate 5 is also substantially hollow and is of a configuration similar to that of the medallion 4. The dimensions of the rear plate 5 are such that the upper portion thereof fits loosely within the upper flange 9 of the front plate 4, and the lower portion fits loosely within the lower flange 9. The side flanges 11 of the rear plate 5 are cut away at 12 to receive the back bar 13 of the supporting structure. The depth of the cut in the flanges 11 is somewhat less than the thickness of the back bar 13. Bolt means 14 preferably fixedly secured to rearwardly extending bosses 15 in the medallion 4 extend through perforations at the center of the overlapped portions 3 of the impact bar sections 2 and through correspondingly registering perforations in the vertical central axis of the clamp plate 5, and lock washers and nuts 16 applied to the free ends of said bolt means, whereby the parts forming the connection are rigidly clamped together. It will be observed that when this condition exists, the medallion 4 firmly clamps the sections 2 somewhat beyond the overlapped portions to conceal the same, the engagement occurring on opposite sides of the center of the impact bar 1 against the impact face thereof, and against the upper and lower edges of the sections 2 in spaced relation to the center. The sections 2 are thereby braced by the flanges 7 of the medallion 4 from the front and by the back bar 13 at the rear against relative movement of the sections 2 about a vertical axis passing through the center of the impact bar. The engagement with spaced portions of the upper and lower edges of the sections 2 adjacent the vertical center of the impact bar 1 by the spaced clamping portions 10 of the upper and lower flanges 9, together with the clamping engagement of spaced portions of the upper and lower edges of the back bar 3 by the side flanges 11 of the clamp plate 5 insures against relative movement between the impact bar sections 2 about a horizontal axis perpendicular to the impact bar at the center thereof. By making the depth of the cuts 12 in the flanges 11 somewhat less than the thickness of the back bar 13, it is possible to effect a considerable clamping pressure upon the central portions of the impact and back bars.

With the construction just described, the impact sections 2 are so firmly connected as to constitute in effect an integral bar, yet afford at a very low cost, an ornamental shape whose cost of manufacture would be practically prohibitive if made from a single integral bar.

While one set of vertically spaced bolt means is illustrated for clamping the plates 4 and 5 together, it will be understood that, if desired, a plurality of sets or any suitable number of bolt means may be employed in order to insure the provision of a rigid connection between the sections 2.

The back bar 13 may be connected to the impact bar 1 in any suitable manner, the means illustrated comprising a pivotal connection at each of the ends of the bars as shown at 17.

The means by which the back bar 13 is connected to the automobile frame may be of any suitable character, that herein illustrated embodying connecting arms 18 whose rear ends (not shown) are connected to the chassis frame horns, for example, and which diverge, their outer ends being clamped to the rearwardly extending portions 19 of the back bar 13. The portion 19 is preferably formed with an elongated horizontal slot 20 and the arm 18 with a registering hole, and a U-shaped clamp plate 21 is formed to receive the portions 18 and 19 so formed as shown in Figure 5. A bolt 22 passing through the clamp plate 21 and portion 19 and arm 18 as shown in Figure 5 receives at its rear end a lock washer and nut 23, whereby the parts are firmly clamped together. The elongated slot or hole 20 in the portion 19 enables the parts to be connected together even though there may be slight variations in the distance between the portions of the arms 18 connected to the chassis frame.

In the form of the invention shown in Figures 7 to 11, inclusive, a somewhat different ornamental design of impact bar is employed, and a correspondingly different clamping structure is used. In accordance with this form of the invention, the impact bar 24 is also of the two piece construction embodying half sections 25. The half sections are constructed so that when in use, their lower edges 26 lie in the same horizontal plane, while their upper edges 27 are upwardly inclined from their outer ends 28 which are pivotally or otherwise connected to the ends of the back bar 29. For further ornamental purposes, each section is deformed substantially centrally and longitudinally thereof to provide in its impact face an elongated tapered depression terminating at both ends short of the ends of the respective sections, with the inner end wider than the other end. The tapered groove thus afforded provides upper and lower spaced impact surfaces 30 which, in the completed bumper, have the appearance of double impact bars diverging from the ends toward the center of the impact bar. The sections 25 may be of any desired transverse section, that herein illustrated being generally concavo-convex as shown in Figures 9 and 11. Since, at their juncture, the sections 25 have substantially uninterrupted impact surfaces, it is not necessary to flatten the overlapped portions 31 thereof, said portions lying flush against each other even though curved as clearly shown in Figure 9.

The connection by which a rigid joint between the sections 2 is afforded is substantially the same as that described previously, except as to details involving the somewhat different shape of cross section of the connected portions of said sections. The clamping structure embodies a front plate or medallion 33 of generally hollow construction including side flanges 34 having clamping edges 35 conforming to the curved impact faces of the respective sections 25, and upper and lower flanges 36 and 37, respectively, having spaced clamping edges 38 and 39 respectively engaging portions of the edges 27 and 26 on opposite sides of the vertical center of the impact bar 24.

The rear clamp plate 40 is of substantially the same general configuration peripherally as the medallion 33 and fits therein for relative backward and forward movement. The plate 40 is formed with side flanges 41 which are cut away or notched at 42 substantially centrally thereof to accommodate the back bar 29. The depth of the notches 42 is somewhat less than the thickness of the back bar 29 so that the movement of the plate 40 in a direction to clamp the bars against each other will be unobstructed.

Bolt means 43 are preferably permanently secured in bosses 44 extending rearwardly from the forward face of the medallion 33, and are vertically spaced apart substantially by the width of the back bar 29. The bolt means 43 pass through registering holes in the lapped portions 32 and in the rear clamp plate 40, and lock washers and nuts 45 applied to the rearwardly extending free ends of the bolt means 43, to rigidly clamp the overlapped portions 32 and back bar 29 against one another.

The construction just described affords a rigid connection between the sections 25 as well as between said sections and the back bar 29 so that the sections 25 function substantially the same as they would if they were integral with each other. Because of the particular design of impact bar shown in Figure 7 et seq., wherein the bar is wider at its center than at its ends, the cost of manufacture of the bar in accordance with the present invention is very materially less than the cost of manufacturing an integral impact bar of this character.

It will be observed that the grooves 30 may be formed by a pressing operation whereby the rear face of the bumper impact bar is formed with a corresponding ridge 46, although it is to be understood that other methods might be employed in ornamenting the impact bar by the formation of grooves. In order that the impact surfaces of the sections 25 may have the appearance of continuity, it will be observed that one of the lapped portions 32 is offset rearwardly as shown at 47 in Figure 10, and that the medallion 33 is of such extent as to completely conceal the overlapped portions.

The ends of the impact and back bars may be bolted together or connected pivotally as at 48 or otherwise if desired. The back bar 29 has its central portion 49 bowed forwardly to reinforce the central portion of the impact bar 24, and the bar 29 may be connected at any suitable points such as at 50 to the chassis frame members (not shown).

The impact bar and back bar are preferably made of spring steel to yield under impact, and the clamp plates may be cast or stamped.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. Bumper construction comprising an impact bar of non-planar cross section and including sections having substantially parallel faces meeting at an angle and having overlapping ends, said ends being flattened to afford a substantial area of contact therebetween, and means associated with said ends for rigidly securing the same together.

2. Bumper construction comprising an impact bar of non-planar cross section and including sections having substantially parallel faces meeting at an angle and having overlapping ends, said ends being flattened to afford a substantial area of contact therebetween, and means associated with said ends for rigidly securing the same together, said means including a support bar having a forwardly bowed portion disposed behind and in contact with one of said ends.

3. Bumper construction comprising a built-up impact bar having two half sections lapped at substantially the center of the bar and arranged at an angle with respect to each other at the center of the bar, a cushion bar connected to the ends of the impact bar and having its central portion bowed forwardly into engagement with the rear face of said impact bar at the center thereof, said bowed portion affording reinforcement for the center of the impact bar, and means for rigidly securing the lapped ends together and for holding the central portions of the bars in position, said means comprising a front clamp having spaced side portions for engaging the front face of the impact bar on both sides of the center, and upper and lower flanges for engaging spaced edge portions of the bar on both sides of the center, and a rear clamp in telescopic relation to the front clamp and arranged to engage the rear face of said bowed portion and to be spaced from the impact bar, and fastening means embedded in the front clamp and passing through said lapped portions and the rear clamp for rigidly securing the parts together.

4. Bumper construction comprising a built-up impact bar having two half sections lapped at substantially the center of the bar and arranged at an angle with respect to each other at the center of the bar, a cushion bar connected to the ends of the impact bar and having its central portion bowed forwardly into engagement with the rear face of said impact bar at the center thereof, said bowed portion affording reinforcement for the center of the impact bar, and means for rigidly securing the lapped ends together and for holding the central portions of the bars in position, said means comprising a front clamp having spaced side portions for engaging the front face of the impact bar on both sides of the center, and upper and lower flanges for engaging spaced edge portions of the bar on both sides of the center, and a rear clamp in telescopic relation to the front clamp and arranged to engage the rear face of said bowed portion and to be spaced from the impact bar, and fastening means embedded in the front clamp and passing through said lapped portions and the rear clamp for rigidly securing the parts together, said rear clamp having horizontally spaced flanges having slots of a depth less than the thickness of the bowed portion and having upper and lower shoulders engaging spaced portions of the upper and lower edges of said bowed portion to thereby prevent pivotal movement between the bars in a generally vertical plane.

5. Bumper construction comprising a built-up impact bar having two half sections lapped at substantially the center of the bar and arranged at an angle with respect to each other at the center of the bar, a cushion bar connected to the ends of the impact bar and having its central portion bowed forwardly into engagement with the rear face of said impact bar at the center thereof, said bowed portion affording reinforcement for the center of the impact bar, and means for rigidly securing the lapped ends together and for holding the central portions of the bars in position, said means comprising a front clamp having spaced side portions for engaging the front face of the impact bar on both sides of the center, and upper and lower flanges for engaging spaced edge portions of the bar on both sides of the center, and a rear clamp in telescopic relation to the front clamp and arranged to engage the rear face of said bowed portion and to be spaced from the impact bar, and fastening means embedded in the front clamp and passing through said lapped portions and the rear clamp for rigidly securing the parts together, one of said overlapped portions being rearwardly offset and disposed behind the other lapped portion so that the impact surfaces of the sections are in substantial continuation of each other.

6. Bumper construction comprising a built-up impact bar having two half sections lapped at substantially the center of the bar and arranged at an angle with respect to each other at the center of the bar, a cushion bar connected to the ends of the impact bar and having its central portion bowed forwardly into engagement with the rear face of said impact bar at the center thereof, said bowed portion affording reinforcement for the center of the impact bar, and means for rigidly securing the lapped ends together and for holding the central portions of the bars in position, said means comprising a front clamp having spaced side portions for engaging the front face of the impact bar on both sides of the center, and upper and lower flanges for engaging spaced edge portions of the bar on both sides of the center, and a rear clamp in telescopic relation to the front clamp and arranged to engage the rear face of said bowed portion and to be spaced from the impact bar, and fastening means embedded in the front clamp and passing through said lapped portions and the rear clamp for rigidly securing the parts together, said fastening means engaging the upper and lower edges of the cushion bar whereby relative vertical movement between the bars is prevented.

7. Bumper construction comprising a built-up impact bar having lapped sections arranged at an angle with respect to each other, a cushion bar reinforcing the juncture of said sections, front clamp means engaging the front face and edge portions of the impact bar on both sides of said juncture, rear clamp means at the rear of said cushion bar, and fastening means connected to both of said means and passing through the lapped portions of said sections for securing the parts together.

8. Bumper construction comprising a built-up impact bar having lapped sections arranged at an angle with respect to each other, a cushion bar reinforcing the juncture of said sections, front clamp means engaging the front face and edge portions of the impact bar on both sides of the juncture of the sections, rear clamp means at the rear of said cushion bar, and fastening means connected to both of said clamp means and passing through the lapped portions of said sections for securing the parts together, said rear clamp means engaging one edge and spaced portions of the other edge of said cushion bar to thereby prevent pivotal movement between the bars.

9. Bumper construction comprising a built-up impact bar having lapped sections arranged at an angle with respect to each other, a cushion bar reinforcing the juncture of said sections, front clamp means engaging the front face and edge portions of the impact bar on both sides of said juncture, rear clamp means at the rear of said cushion bar, and fastening means connected to both of said means and passing through the lapped portions of said sections for securing the parts together, said rear clamp means being spaced from the impact bar to afford clearance so that both of said clamp means may be drawn tightly against the bars without interfering with each other.

10. Bumper construction comprising a built-up impact bar having lapped sections arranged at an angle with respect to each other, a cushion bar reinforcing the juncture of said sections, front clamp means engaging the front face and edge portions of the impact bar on both sides of the juncture of the sections, rear clamp means at the rear of said cushion bar, and fastening means connected to both of said means and passing through the lapped portions of said sections for securing the parts together, one of the lapped portions being offset and disposed behind the other lapped portion so that the impact surfaces of the sections are in substantial continuation of each other.

11. Bumper construction comprising a built-up impact bar having lapped sections arranged at an angle with respect to each other, a cushion bar reinforcing the juncture of the sections, rear clamp means at the rear of said cushion bar, and fastening means connected to both of said means and passing through the lapped portions of said sections for securing the parts together, said fastening means engaging the edges of the cushion bar whereby relative movement between the bars edgewise of the cushion bar is prevented.

HERBERT S. JANDUS.